United States Patent [19]
Schriever et al.

[11] 3,813,612
[45] May 28, 1974

[54] METHOD AND APPARATUS FOR ENHANCING ELECTRICAL DISCHARGES IN GAS LASERS

[75] Inventors: Richard L. Schriever; Harold R. Johansen, both of Livermore; Richard E. Sandy, Stevinson, all of Calif.

[73] Assignee: The United States of America as represented by the United States Atomic Energy Commission, Washington, D.C.

[22] Filed: Jan. 18, 1973

[21] Appl. No.: 324,601

[52] U.S. Cl............. 331/94.5 G, 313/223, 330/4.3, 331/94.5 PE
[51] Int. Cl............................................. H01s 3/22
[58] Field of Search.................... 331/94.5; 330/4.3; 313/223

[56] References Cited
UNITED STATES PATENTS
3,633,125 1/1972 Whitehouse...................... 331/94.5
3,743,963 7/1973 Bullis et al........................ 331/94.5

OTHER PUBLICATIONS
Jauan et al., IEEE J. of Quantum Electronics QE-8, Nov. 1972, pp. 827–832, GC 44717.

Primary Examiner—Ronald L. Wibert
Assistant Examiner—R. J. Webster
Attorney, Agent, or Firm—John A. Horan; F. A. Robertson; L. E. Carnahan

[57] ABSTRACT

A method and apparatus for enhancing electrical discharges in gas lasers by adding small amounts of a low ionization potential gas to the main lasing gas mixture. The additive does two things: (1) allows a d.c. high pressure discharge, and (2) allows enhanced pulsed operation (i.e., double discharge). The enhancement method is particularly applicable to double discharge gas lasers utilizing gaseous lasing mixture of $He/N_2/CO_2$, for example, at atmospheric pressures, wherein the addition of an organic gas additive to the lasing mixture suppresses arcing and increases current. The method is carried out by metering small amounts of the additive into a flowing stream of lasing gaseous media, or by addition of the additive gas to a static volume of lasing gas.

8 Claims, 2 Drawing Figures

METHOD AND APPARATUS FOR ENHANCING ELECTRICAL DISCHARGES IN GAS LASERS

BACKGROUND OF THE INVENTION

The invention described herein was made in the course of, or under, Contract No. W-7405-ENG-48 with the United States Atomic Energy Commission.

This invention relates to enhancing electrical discharges in gas lasers, particularly the so-called "double discharge" gas lasers, and more particularly to a method and apparatus for providing uniform direct current discharges in atmospheric pressure mixtures of gaseous lasing medium by the addition of small amounts of a low ionization potential gas to the main lasing gas mixture.

One method of exciting an atmospheric pressure gas laser is the so-called "double discharge" technique. Double discharge lasers are well known in the art, as exemplified by the Review of Scientific Instruments, Vol. 41, No. 11, Nov. 1970, pp. 1578–1581. Briefly, the double discharge technique utilizes a first "trigger" electrical discharge to initiate the main electrical discharge which excites the lasing gas. Because of the high voltages involved (10s of kilovolts), the double discharge is subject to severe arcing and other effects which are undesirable from the standpoint of a smooth and predictable excitation of the lasing gas mixture.

In view of recent interest in atmospheric pressure $CO_2$ gas lasers for high pulsed energy applications, investigation of high pressure discharge phenomenon has been stimulated and different prior art approaches have been developed in attempts to achieve uniform pulsed discharges in atmospheric pressure gases. Among these prior efforts has been the proposed use of cesium as a gas additive, but the problems involved in working with cesium have made this approach impractical.

SUMMARY OF THE INVENTION

The present invention is a method and apparatus for suppressing arcing and increasing current in the double discharge laser by adding a small amount of a low ionization potential organic gas to the main lasing gas mixture. Because of its low ionization potential, the gas additive acts as an easily-tapped "reservoir" of electrons which help to initiate and smooth out the electrical discharge. The electrons are released under the influence of electron collisions or multi-photon photoionization by light from the trigger discharge. The inventive method has produced significant improvements in discharge characteristics of $He/N_2/CO_2$ mixtures, for example, by the addition of small amounts of gases such as benzene, toluene, xylene, and trimethyl benzene, which have low ionization potential. The inventive method can be carried out by metering the organic additive gas into a flowing stream of the lasing gaseous media, or can be added to a static volume of lasing gas.

Therefore, it is an object of this invention to provide a method and apparatus for enhancing electrical discharges in gases.

A further object of the invention is to provide a method and apparatus for suppressing arcing and increasing current in a double discharge laser.

Another object of the invention is to provide a method for enhancing electrical discharges in gases by the use of an organic additive gas which is easily ionized and has a vapor pressure which is high enough to allow an adequate amount of the additive to be added to the main gas.

Another object of the invention is to provide a method for suppressing arcing and increasing current in a double discharge laser by adding small amounts of a low ionization potential gas to the main lasing gas.

Another object of the invention is to provide a method and apparatus for enhancing the performance of a gas laser by metering a low ionization potential gas into a flowing stream of gaseous lasing media.

Other objects of the invention will become readily apparent from the following description and accompanying drawings.

DESCRIPTION OF THE INVENTION

Figure 1:
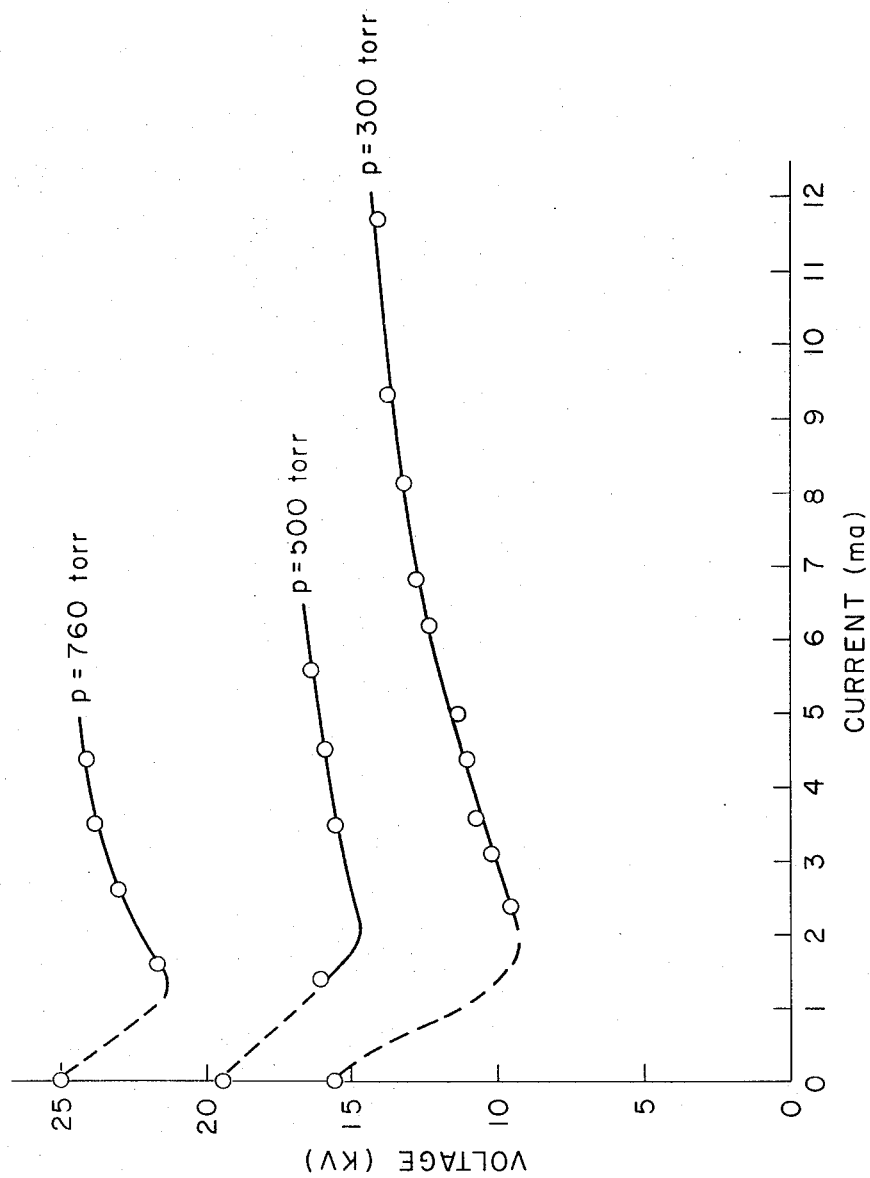
FIG. 1 graphically illustrates the current-voltage characteristics of a gaseous mixture utilizing a gas additive in accordance with the invention.

The present invention is a method and apparatus for suppressing arcing and increasing current, particularly in a double discharge laser utilizing atmospheric pressure lasing gases, by adding small amounts of an organic additive gas. Such a gas must be easily ionized and must have a vapor pressure which is high enough to allow an adequate amount of the additive gas to be added to the high pressure lasing gas. There are two separate techniques: (1) d.c. discharge for preionization, and (2) using conventional double discharge for preionization. By this method, it is possible to achieve a continuous uniform discharge in atmospheric pressure lasing gas mixtures, such as $He/N_2/CO_2$, which exhibits qualitatively the behavior of a low pressure glow discharge. Further, it is possible to use this discharge as a uniform source of plasma to initiate a uniform high current discharge in the same gas volume, thereby being particularly applicable for utilization in double discharge lasers utilizing atmospheric pressure lasing gaseous media. In other words, because of its low ionization potential, the gas additive acts as an easily-tapped "reservoir" of electrons which held to initiate and smooth out the electrical discharge. For example, significant improvements in discharge characteristics of $He/N_2/CO_2$ gaseous mixtures were obtained by adding small amounts of benzene, toluene, xylene, and trimethyl benzene. These organic materials were selected because of their low ionization potential (about 8 to 9 volts) compared to that of the $He/N_2/CO_2$ mixture (about 18 volts). It has also been determined that there is an optimum concentration of additive for each specific composition of lasing gas. For example, the presence of 0.1 percent xylene in an 80/10/10 mixture of $He/N_2/CO_2$ gave best experimental results.

Initial experimental work has been done with several versions of a glass rod-finned cathode double discharge, described in greater detail hereinafter. Gas volumes from ½ to 10 liters with cathode-anode separations between 3 and 12 cm have been utilized in these tests. The discharge circuitry utilized capacitor banks with a range of capacitance between 0.016 $\mu fh$ and 0.4

μfd with voltage capabilities up to 90 kV. Gas mixtures of He/N$_2$/CO$_2$ in proportions 90/5/5 and 80/10/10 were utilized in view of the interest in atmospheric pressure CO$_2$ gas lasers for high pulsed energy applications.

The general behavior of these discharge devices was found to be characterized by a series RLC discharge with the gas acting as a non-linear resistance. The equivalent non-linear resistance of the gas can be modeled by a voltage drop expressed as:

$$V_{gas} = -V_o + ki^{1/n}$$

where $n$ is on the order of two, where $k$ is a physical constant, and where $i$ is the discharge current. The values of $V_o$, $k$ and $n$ have been determined experimentally. This is seen to be an approximation to the current-voltage characteristic of glow discharge. The characteristics of the double discharge devices are essentially those of pulsed high pressure glow discharges. The magnitudes of the current pulses for different discharge voltages are predicted by calculations using empirical values of $V_o$, $k$ and $n$ in this simplified model.

Normalized calculations using the above model are similar to those commonly used in flashlamp circuit design. Experimental data from each double discharge tested are found to be in significant agreement with these calculations. In each case the device is characterized by constants which depends on the gas mixture, gas pressure and cathode design.

The ionization potentials of the individual components of the He/N$_2$/CO$_2$ mixture in the proportion of 90/5/5 and at atmospheric pressure are 24.5 volts, 15.5 volts and 14.4 volts, respectively, with an average of about 18 volts for the mixture. Benzene, toluene, xylene, and trimethyl benzene were choosen as the additives because of their low ionization potentials and high vapor pressures. These gases also have low absorption coefficients in the 10.6 micron wavelength region. The properties of these gases are listed in the following table:

GAS ADDITIVE IONIZATION POTENTIAL AND VAPOR PRESSURE

| | Gas | Ionization Potential | Vapor Pressure (T = 27°C) |
|---|---|---|---|
| I | Benzene | 9.24 ev | 110 torr |
| II | Toluene | 8.5 ev | 27 torr |
| III | Xylene | 8.56 ev | 10 torr |
| IV | Trimethyl Benzene | 8.4 ev | 2 torr |

Experimentally it has been found that the best results were obtained in the above lasing mixture with the addition of xylene at a partial pressure of about one torr. From this it is clear that the vapor pressure as given in the above table is more than adequate.

In these initial experiments to verify the inventive concept, the work involved a static volume of lasing gas, and was done in a small belljar system. For example, the electrodes used were smooth brass 10 cm in diameter with an edge radius of 0.5 cm and were separated by 11.5 cm. The cathode had a sandblasted finish. Measurements of the discharge current-voltage characteristics were made using a high voltage d.c. supply and a large series resistor (typically ~ 2x10$^6$ ohms) and with an electrostatic voltmeter. The current voltage characteristics for a 90/5/5 mixture of He/N$_2$/CO$_2$ + 0.5 percent xylene for three different total pressures are shown in FIG. 1.

The curves of FIG. 1, which represent the d.c. preionization technique and need not necessarily apply to the double discharge technique, resemble the corresponding curves of low pressure glow discharges. A point of maximum voltage with minimum current and a constant voltage higher current region which is analogous to a normal glow region is shown. The maximum in each case has been limited by the external circuit as is typical for low pressure glow discharges. The cathode current density of a low pressure glow discharge is known to be proportional to the square of the pressure and much higher current densities than those of FIG. 1 would be expected for a true atmospheric pressure glow discharge.

A pulsed discharge superimposed on the existing glow resulted in over 3 amps/cm$^2$ of uniform discharge current during a microsecond pulse at atmospheric pressure of a 90/5/5 mixture of He/N$_2$/CO$_2$. This was accomplished by placing a by-pass capacitor across the power supply and load resistor. An external capacitor bank was then coupled through a transformer and into the discharge. This discharge current was then allowed to increase through the glow region and into a transient high current region where significant power can be coupled into the gas.

While the above tests were preliminary in nature, they clearly established that a uniform d.c. discharge in an atmospheric pressure gas mixture can be achieved by using low ionization potential gas additives. In addition it has also been shown experimentally that such a d.c. atmospheric discharge can provide a uniform initial plasma to support a high current pulsed discharge. Also, while the above-described tests involved a static volume of lasing gas, to verify the inventive concept, practical lasers of this type generally employ a flowing gas stream, and thus as described hereinafter with respect to FIG. 2, the invention also encompasses a method of metering the gas additive into such a flowing stream in a double discharge laser; and further tests have shown that the inventive method of adding a low ionization potential gas to a flowing stream of main lasing gas mixture suppresses arcing and increases current flow, thereby increasing the effectiveness of gas lasers for high pulsed energy applications.

Figure 2:
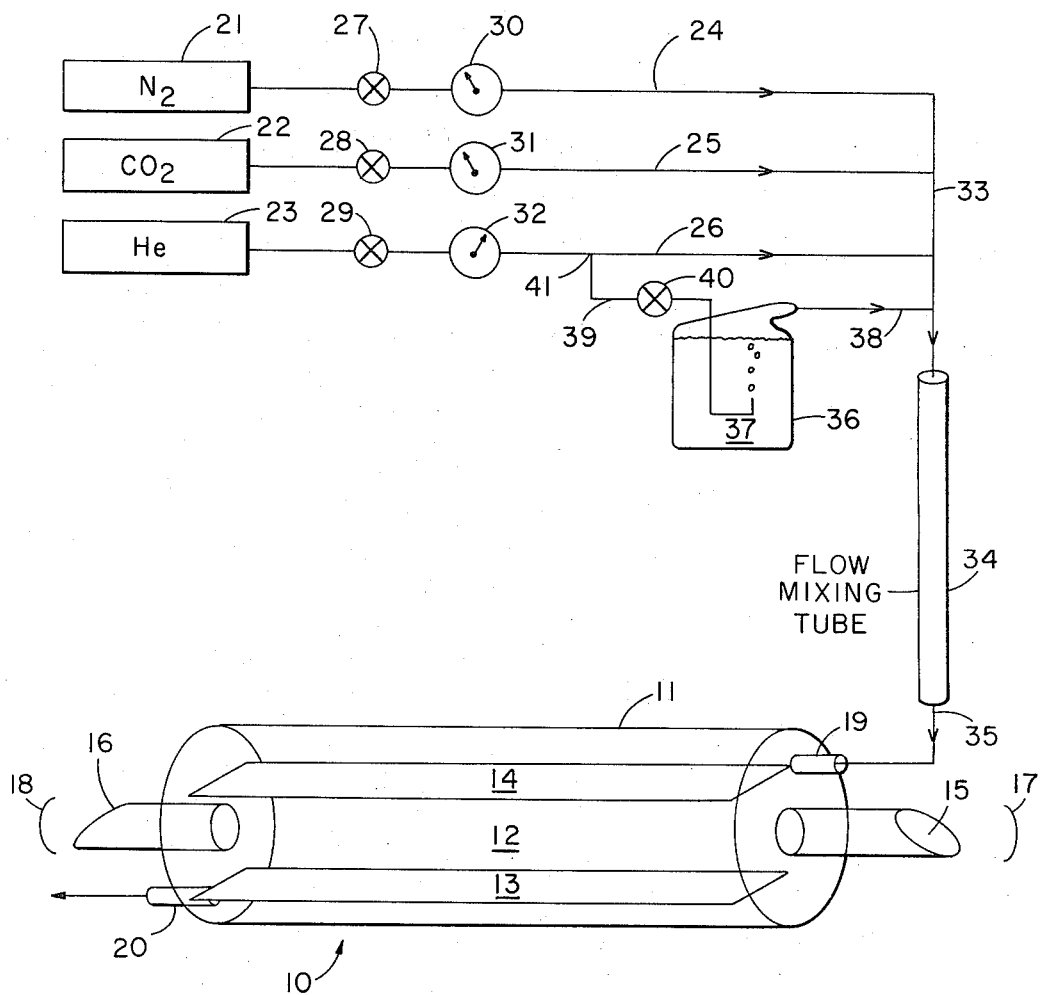
FIG. 2 illustrates an apparatus in accordance with the invention for metering an additive gas into a flowing stream of gaseous lasing medium of a double discharge gas laser.

FIG. 2 illustrates an apparatus in accordance with the invention wherein a low ionization potential gas is metered into a flowing stream of lasing gaseous medium. The FIG. 2 embodiment comprises a double-discharge, atmospheric pressure gas laser with the trigger electrode or grid, the power supply, and the circuitry therefor amitted for clarity as the details of the laser per se do not constitute part of this inevntion. However, double-discharge lasers are known in the art as illustrated by the above-cited Review of Scientific Instruments article. As illustrated, the FIG. 2 embodiment comprises a laser system generally indicated at 10 and composed of a container or vessel 11 defining therein a cavity 12 wherein are operatively mounted a cathode 13 and an anode 14, it being understood, though not shown, a trigger electrode is positioned closely adjacent the cathode and between the cathode and anode. A pair of windows 15 and 16, positioned at the Brewster angle, are mounted on opposite ends of vessel 11, with a pair of appropriate mirrors or reflectos 17 and 18, respectively, mounted in spaced relation to windows 15 and 16, thereby forming an optical resonant cavity. Vessel 10 is provided with a fluid or gaseous inlet 19 and an outlet 20 whereby a gaseous lasing medium is directed through the cavity 12. The lasing gaseous medium such as a mixture of $He/N_2/CO_2$ is supplied, for example, from gas bottles or containers 21, 22 and 23 containing $N_2$, $CO_2$ and He, respectively. The gas from bottles 21, 22 and 23 is directed via respective conduits 24, 25 and 26 through respective control valves 27, 28 and 29 and flow meters 30, 31 and 32 into a common conduit 33 which discharges into a turbulent flow mixing tube 34 of a type known in the art, wherein the gaseous are mixed, the gaseous mixture from mixing tube 34 passing through a conduit 35 and inlet 19 into cavity 12 of vessel 11. A bubbler mechanism 36 containing xylene 37, for example, is connected via a conduit 38 to common conduit 33. A conduit 39 having a control valve 40 therein is connected at one end 41 to helium conduit 26 with the other end extending into bubbler 36 below the surface of the xylene 37.

In operation, control valves 27, 28 and 29 are actuated to supply through respective conduits 24, 25 and 26 a desired ratio, such as 5/5/90 described above, of $N_2$, $CO_2$, and He from respective gas supply bottles 21, 22 and 23, which is directed as indicated by the arrows into common conduit 33. Control valve 40 is actuated to bleed at least a portion of the He flowing in conduit 26 through conduit 39 into bubbler 36 whereby xylene 37 is bubbled via conduit 38 into common conduit 33, which directs the gases into the turbulent flow mixing tube 34 wherein the gaseous are mixed and discharged via conduit 35 and inlet 19 into laser cavity 12, whereupon an electrical discharge between cathode 13 and anode 14 excites the gaseous mixture or medium causing lasing action, whereafter the gaseous medium is discharged in a continuous flow from cavity 12 via outlet 20 as indicated by the arrow. The partial presure of the xylene 37 in the mixture is determined by the amount in the bubbled He and the fraction of bubbled to unbubbled He, as controlled by valve 40. Thus any partial pressure up to the vapor pressure of xylene is obtainable. For example, the gaseous medium flowing into cavity inlet 19 from the flow mixing tube 34 has a ratio of 90/5/5 mixture of $He/Ne/CO_2$ plus 0.5 percent xylene.

It has thus been shown that the present invention provides a method and apparatus for suppressing arcing and increasing current in a gaseous laser by adding a small amount of a low ionization potential gas to the main lasing gaseous mixture, thereby substantially improving the performance of gaseous laser systems, particularly double discharge gas lasers.

While particular embodiments of the invention have been illustrated and/or described, modifications will become apparent to those skilled in the art, and it is intended to cover in the appended claims all such modifications as come within the spirit and scope of the invention.

What I claim is:

1. A method for suppressing arcing and increasing current during an electrical discharge through lasing medium in a gas laser comprising the step of adding a low ionization potential organic material gas selected from the group consisting of benzene, toluene, xylene, and trimethyl benzene to the main lasing gaseous medium, the added gas acting as an easilytapped reservoir of electrons which help to initiate and smooth out the electrical discharge through the lasing medium.

2. The method defined in claim 1, wherein the step of adding the organic material gas to the lasing medium is carried out by bubbling at least a portion of the lasing medium through a quantity of low ionization potential gas whereby the gas is mixed with the lasing medium.

3. The method defined in claim 1, additionally including the step of producing the lasing gaseous medium by supplying a plurality of selected gases to a common point, mixing the thus selected gases and the added low ionization potential organic material gas, and directing the mixture into the laser cavity.

4. An apparatus for suppressing arcing and increasing current in a gas laser activated by an electrical discharge across lasing medium contained within a vessel comprising: means for directing a gaseous lasing medium through said vessel of said gas laser, means for supplying said gaseous lasing medium to said first-mentioned means, means for adding to said gaseous lasing medium a low ionization potential organic material gas selected from the group consisting of benzene, toluene, xylene, and trimethyl benzene.

5. The apparatus defined in claim 4, additionally including means for turbulent flow mixing the added gas with the gaseous lasing medium.

6. The apparatus defined in claim 4, wherein said gaseous lasing medium comprises a mixture of a plurality of gases, and additionally including means for supplying said plurality of gases, means for controlling the amount of each of said plurality of gases thus supplied.

7. The apparatus defined in claim 6, wherein said plurality of gases consist of He, $N_2$ and $CO_2$.

8. The apparatus defined in claim 4, wherein said means for adding said low ionization potential gas comprises a bubbler means containing gas to be added, means for directing a portion of the gaseous lasing medium through said bubbler means for directing said gas into said gaseous lasing medium, and means for controlling the amount of said gaseous lasing medium directed through said bubbler means.

* * * * *